(12) United States Patent
Kyle et al.

(10) Patent No.: US 7,313,680 B2
(45) Date of Patent: Dec. 25, 2007

(54) APPARATUS AND METHOD FOR DETECTING THE PRESENCE OF A FLOPPY DRIVE BY READING A GENERAL PURPOSE INPUT PRIOR TO READING A FLOPPY DRIVE CONTROLLER

(75) Inventors: Erik Kyle, Tomball, TX (US); Greg P. Ziarnik, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 484 days.

(21) Appl. No.: 10/836,915

(22) Filed: Apr. 30, 2004

(65) Prior Publication Data

US 2005/0257091 A1    Nov. 17, 2005

(51) Int. Cl.
*G06F 9/00* (2006.01)
*G06F 15/177* (2006.01)
*G06F 13/20* (2006.01)
*H05K 7/10* (2006.01)

(52) U.S. Cl. .............................. 713/1; 713/2; 713/100; 710/300; 710/301; 710/302

(58) Field of Classification Search ................ 713/1, 713/2, 100; 710/300, 301, 302; 439/71, 439/108
See application file for complete search history.

(56) References Cited

U.S. PATENT DOCUMENTS

| | | | | |
|---|---|---|---|---|
| 5,636,347 A | * | 6/1997 | Muchnick et al. | 710/302 |
| 5,884,102 A | * | 3/1999 | England et al. | 710/62 |
| 5,944,541 A | * | 8/1999 | Payne | 439/108 |
| 6,705,524 B2 | * | 3/2004 | Chow et al. | 235/441 |

* cited by examiner

*Primary Examiner*—James K. Trujillo

(57) ABSTRACT

One of the ground pins on a conventional floppy drive host connector is coupled to an input of a computer system and to a supply potential via a pull-up resistor. When a floppy drive is connected to the floppy drive host connector, the pin is pulled to ground by virtue of the ground connections within the floppy drive device. When a floppy drive is not connected to the floppy drive host connector, the pin remains at the supply potential. BIOS firmware or another system within the computer may detect the presence of the floppy drive by simply reading the value of the input.

9 Claims, 3 Drawing Sheets

| FLOPPY CONNECTOR PINOUT ||||
|---|---|---|---|
| FUNCTION | PIN | PIN | FUNCTION |
| GND | 1 | 2 | DRVDEN# |
| KEY | 3 | 4 | WDO |
| KEY | 5 | 6 | N/C |
| GND | 7 | 8 | INDEX |
| GND | 9 | 10 | MOTOR1 |
| GND | 11 | 12 | DRIVE2 |
| GND | 13 | 14 | DRIVE1 |
| GND | 15 | 16 | MOTOR2 |
| GND | 17 | 18 | DIRECTION |
| GND | 19 | 20 | STEP |
| GND | 21 | 22 | WRITE DATA |
| GND | 23 | 24 | WRITE ENABLE |
| GND | 25 | 26 | TRACK0 |
| GND | 27 | 28 | WRITE PROTECT |
| GND | 29 | 30 | READ DATA |
| GND | 31 | 32 | HEAD SELECT |
| GND | 33 | 34 | DISK CHANGE |

*FIG. 3*
*(PRIOR ART)*

APPARATUS AND METHOD FOR DETECTING THE PRESENCE OF A FLOPPY DRIVE BY READING A GENERAL PURPOSE INPUT PRIOR TO READING A FLOPPY DRIVE CONTROLLER

FIELD OF THE INVENTION

This invention relates generally to computer system hardware and software, and more particularly to techniques for detecting the presence of a floppy drive in a computer system.

BACKGROUND

Currently the number of computer systems shipping without a floppy drive is increasing. But many computer systems still include a floppy drive. Basic input/output services ("BIOS") firmware must be flexible enough to handle both possibilities. So, the BIOS must check for the presence of a floppy drive at boot time.

One difficulty this presents is that checking for the presence of a floppy drive during the boot procedure adds time to the boot procedure. Consumers and some certification authorities desire a short boot procedure.

SUMMARY OF THE INVENTION

In a computer system according to a preferred embodiment of the invention, one of the ground pins on a conventional floppy drive host connector is coupled to an input of the computer system and to a supply potential via a pull-up resistor. When a floppy drive is connected to the floppy drive host connector, the pin is pulled to ground by virtue of the ground connections within the floppy drive device. When a floppy drive is not connected to the floppy drive host connector, the pin remains at the supply potential.

BIOS firmware or any other system within the computer system may detect the presence of the floppy drive by simply reading the value of the input. If the input is low, then the system may conclude that a floppy drive is present. But if the input is high, then the system may conclude that a floppy drive is not present.

BRIEF DESCRIPTION OF THE DRAWINGS

FIG. 3 is a table illustrating connections of the pins on a floppy drive host connector according to the prior art.

DETAILED DESCRIPTION OF THE PREFERRED EMBODIMENTS

Figure 1:
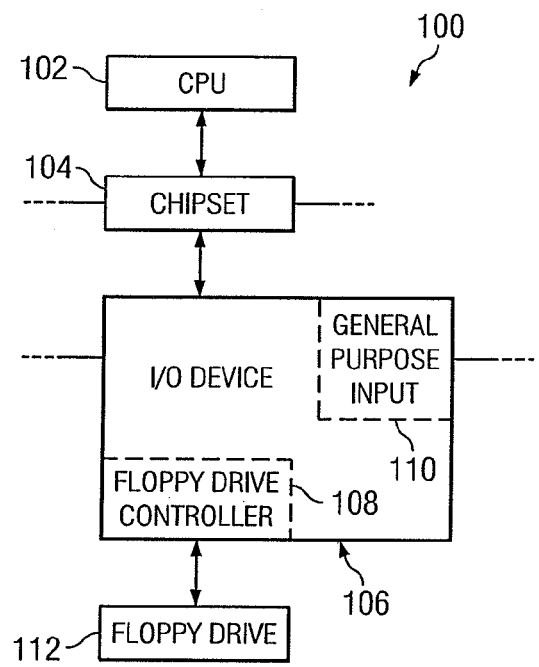
FIG. 1 is a block diagram illustrating a portion of a computer system according to the prior art.

FIG. 1 illustrates certain hardware components within a typical modern computer system 100. One or more CPU chips 102 are connected by a bus to a chipset 104. Chipset 104 may comprise one or more chips for providing interfaces to various other components of the computer system such as main memory, one or more hard disks, a network adapter, a graphics system, a sound system, and numerous input/output ("I/O") systems such as PCI systems, USB systems and the like. It is common to couple a multi-purpose I/O device 106 to chipset 104. Such a multi-purpose I/O device 106 may contain, for example, mouse and keyboard interfaces, parallel and serial ports, and fan controls. I/O device 106 may also contain a floppy drive controller 108 and one or more general purpose inputs 110. Depending on the configuration of computer system 100, floppy drive controller 108 may or may not be coupled to a floppy drive device 112. FIG. 1 is provided herein by way of illustration and not by way of limitation. Persons having ordinary skill in the art and having reference to this specification will readily understand how to create embodiments of the claimed invention for functioning in a wide variety of conventional host computer systems including those other than that shown in FIG. 1.

Figure 2:
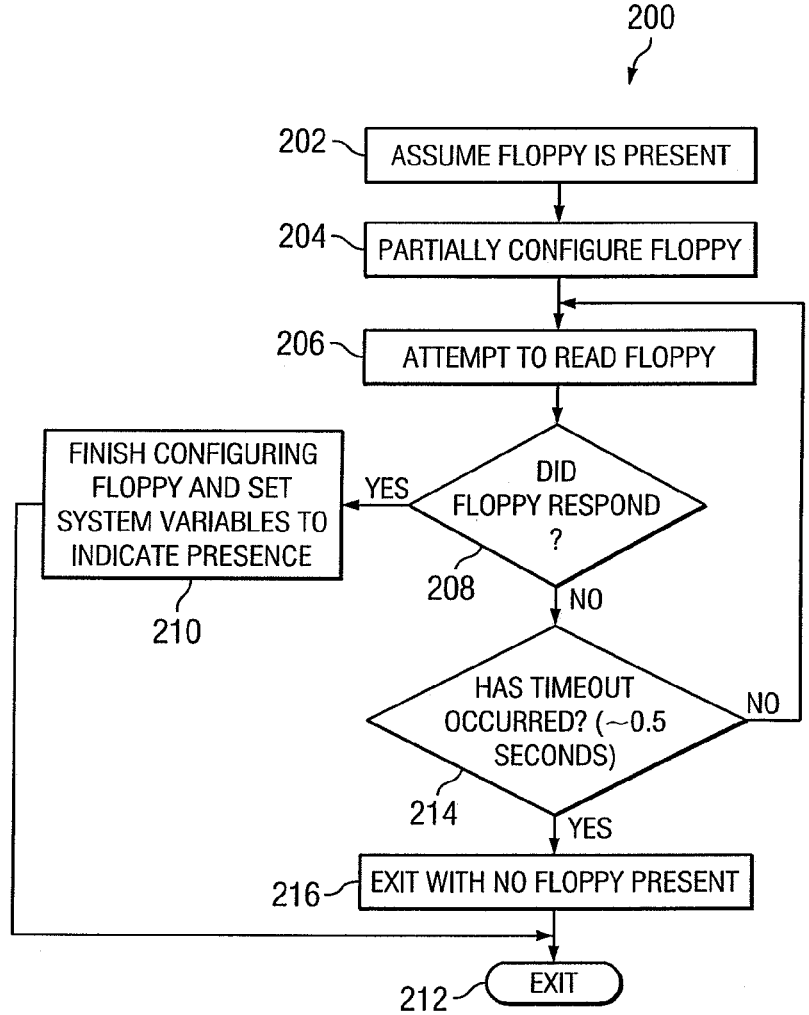
FIG. 2 is a flow diagram illustrating a method of detecting a floppy drive according to the prior art.

FIG. 2 illustrates a method 200 of detecting the presence of floppy drive 112 according to the prior art. Method 200 is performed by BIOS firmware during a boot procedure (defined herein to include everything that happens between the time when the computer is turned on or is reset until the time when a user's desired operating system is loaded and running.) In step 202, the BIOS assumes a floppy drive is present and partially configures the floppy drive in step 204 by setting register values in I/O device 106 necessary for communicating with floppy drive 112. In step 206, the BIOS attempts to read data from floppy drive 112. If the BIOS determines in step 208 that floppy drive 112 has responded to the read request, then the BIOS proceeds with step 210. In step 210, the BIOS completes the configuration of the floppy drive and sets system variables to indicate that floppy drive 112 is present. The BIOS then exits the floppy drive detection procedure in step 212.

In order to determine if floppy drive 112 will respond to the read request, the BIOS must observe a timeout interval as indicated at step 214. Such a timeout interval must be at least on the order of 0.5 seconds in length. Only when floppy drive 112 has not responded within the timeout interval may the BIOS determine safely that no floppy drive device is present. Inevitably, the observation of this timeout interval adds to the duration of the boot procedure. Embodiments of the invention overcome this difficulty and will now be described in relation to FIGS. 3-5.

FIG. 3 illustrates the pin assignments on a conventional floppy disk drive host connector. A total of 34 pins are allotted. Roughly half of these pins are intended to be connected to a signal such as motor1, drive2, drive1, etc. The other half of the pins are intended to be connected to a ground. Signal pins and ground pins are interleaved so that each signal wire in the flat floppy disk drive cable will have a ground wire on either side of it. This configuration is intended to assure signal integrity by minimizing cross-talk between the signals on the cable. The inventors hereof have determined, however, that the signals on a floppy drive cable have sufficiently high voltage levels and sufficiently low frequencies that strictly alternating signal wires with ground wires is not necessary to assure proper operation.

Figure 4:
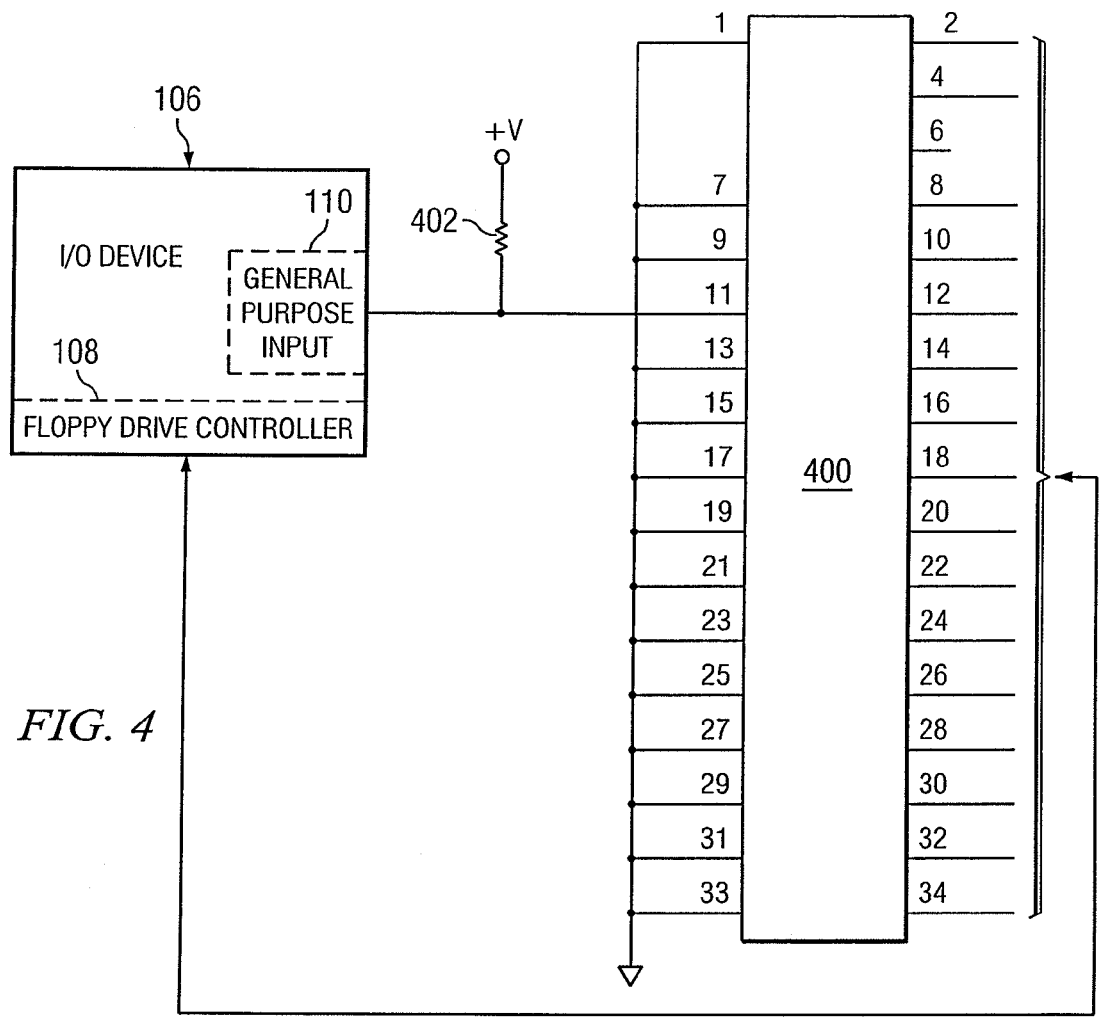
FIG. 4 is a schematic diagram illustrating connections of the pins on a floppy drive host connector according to a preferred embodiment of the invention.

In a preferred embodiment of the invention, the connections of a floppy drive host connector 400 may be modified as shown in FIG. 4. Any one of the ground pins of connector 400 (pin 1 or odd pins from 3-33) may be disconnected from ground and connected instead to an input of the host computer system and to a supply voltage via a pull-up resistor. In the embodiment shown, this is accomplished by connecting pin 11 from connector 400 to general-purpose input 110 on I/O device 106 and to supply potential +V through pull-up resistor 402. Even-numbered pins 2-34 are connected to floppy drive controller 108 as they ordinarily would be. When a floppy drive device is connected to floppy drive host connector 400, pin 11 is pulled to ground by virtue of the ground connections within the floppy drive device. When a floppy drive is not connected to floppy drive host connector 400, pin 11 remains at the supply potential. In alternative embodiments, other ground pins of connector 400 may be used instead of pin 11, and other types of computer system inputs may be employed instead of general-purpose input 110.

Figure 5:
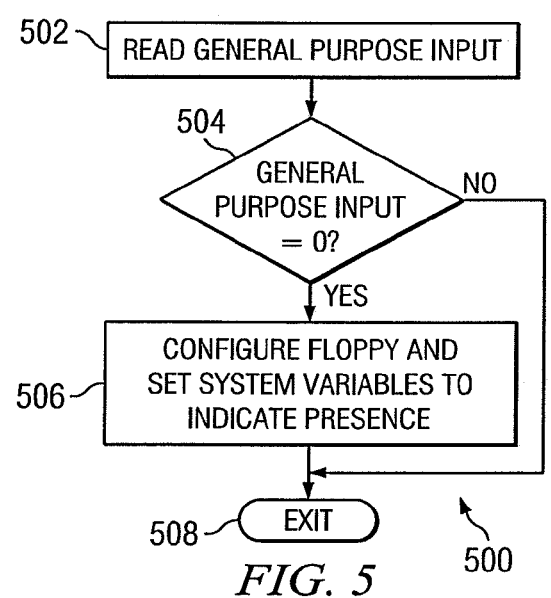
FIG. 5 is a flow diagram illustrating a method of detecting a floppy drive according to a preferred embodiment of the invention.

FIG. 5 illustrates a method 500 for detecting the presence of a floppy drive according to a preferred embodiment of the invention. In step 502, the computer system reads an input to which the modified ground pin has been connected. In one embodiment, the reading step may be performed by BIOS firmware during the boot procedure. In other embodiments, the reading step may be performed by any other system within the host computer and at any other time. In an embodiment such as that shown in FIG. 4, the reading step would involve reading the state of general-purpose input 110 as shown at step 504. If the state of the general-purpose input is equal to 1 or is "high," then the BIOS may conclude that floppy drive 112 is not present and may exit the floppy drive detection procedure at step 508. But if the state of general-purpose input 110 is equal to 0 or is "low," then the BIOS may conclude that floppy drive 112 is present. In such a case, the BIOS should then configure the floppy drive and set system variables to indicate the presence of the floppy drive as shown at step 506.

One advantage provided by embodiments of the invention is that computer systems according to the invention need not observe timeout interval 114 during the boot procedure in order to detect the presence of floppy drive 112. Therefore, the duration of the boot procedure is shortened relative to that of the prior art.

While the invention has been described in detail with reference to preferred embodiments thereof, the described embodiments have been presented by way of example and not by way of limitation. It will be understood by those skilled in the art that various changes may be made in the form and details of the described embodiments without deviating from the spirit and scope of the invention as defined by the appended claims.

What is claimed is:

1. Apparatus for detecting the presence of a floppy drive in a computer system, comprising:
   a floppy drive host connector having a ground pin;
   a general purpose input to the computer system; and
   a supply potential;
   wherein the ground pin is connected to the general purpose input of the computer system and, through a pull-up resistor, to the supply potential;
   and wherein the apparatus is configured to read the general purpose input of the computer system prior to reading a floppy drive controller connected to the floppy drive host connector.

2. The apparatus of claim 1:
   wherein the ground pin is pin 11 according to a pin numbering system of the floppy drive host connector.

3. The apparatus of claim 1, further comprising:
   a floppy drive controller connected to the computer system and connected to the floppy drive host connector.

4. The apparatus of claim 3, wherein the ground pin is disconnected from the floppy drive controller.

5. The apparatus of claim 1, wherein the ground pin is interleaved between a signal pin and at least one of a signal pin and a ground pin of the floppy drive host connector.

6. A method of detecting the presence of a floppy drive in a computer system, comprising:
   reading an input that is connected to a ground pin of a floppy drive host connector and, through a pull-up resistor, to a supply potential;
   if the input is low, concluding that the floppy drive is present; and
   if the input is high, concluding that the floppy drive is not present;
   wherein the reading comprises reading a general purpose input to the computer system prior to reading a floppy drive controller connected to the floppy drive host connector.

7. The method of claim 6:
   wherein the ground pin is pin 11 according to a numbering system of the floppy drive host connector.

8. The method of claim 6:
   wherein the reading step is performed by BIOS firmware.

9. The method of claim 8:
   wherein the reading step occurs during a boot procedure.

* * * * *